United States Patent
MacInnes

(10) Patent No.: US 8,232,677 B2
(45) Date of Patent: Jul. 31, 2012

(54) CASCADED MULTI-SUPPLY POWER SUPPLY

(75) Inventor: Roddi MacInnes, Scarborough (CA)

(73) Assignee: ATI Technologies ULC, Markham, Ontario (CA)

( * ) Notice: Subject to any disclaimer, the term of this patent is extended or adjusted under 35 U.S.C. 154(b) by 0 days.

(21) Appl. No.: 11/620,128

(22) Filed: Jan. 5, 2007

(65) Prior Publication Data
US 2008/0168281 A1 Jul. 10, 2008

(51) Int. Cl.
*H02J 1/00* (2006.01)
*G06F 1/00* (2006.01)

(52) U.S. Cl. .......................................... 307/82; 713/330

(58) Field of Classification Search .................... 307/82, 307/41; 713/330
See application file for complete search history.

(56) References Cited

U.S. PATENT DOCUMENTS

| | | | | |
|---|---|---|---|---|
| 4,730,122 A * | 3/1988 | Dreibelbis et al. | ............... | 307/75 |
| 5,734,585 A * | 3/1998 | Beard | ............... | 700/286 |
| 6,011,322 A * | 1/2000 | Stumfall et al. | ............... | 307/43 |
| 6,084,383 A * | 7/2000 | Borinsky et al. | ............... | 323/268 |
| 6,316,924 B1 * | 11/2001 | Stapleton et al. | ............... | 323/273 |
| 6,448,672 B1 * | 9/2002 | Voegeli et al. | ............... | 307/52 |
| 6,909,204 B2 * | 6/2005 | Batey | ............... | 307/130 |

* cited by examiner

*Primary Examiner* — Michael Rutland Wallis
(74) *Attorney, Agent, or Firm* — Faegre Baker Daniels LLP

(57) ABSTRACT

A multi-supply power supply circuit has a first power supply regulating circuit that produces a first power supply voltage; and a second power supply regulating circuit that receives the first power supply voltage from the first power supply regulating circuit as an enable input signal and is operative to produce a second and different power supply voltage. In one embodiment, the first power supply voltage may reach a steady state condition prior to the second power supply voltage reaching a steady state condition. In one example, the multi-supply power supply circuit includes a plurality of cascaded low drop out power supply regulating circuits.

9 Claims, 5 Drawing Sheets

CASCADED MULTI-SUPPLY POWER SUPPLY

FIELD OF THE DISCLOSURE

The disclosure relates generally to devices having a power supply circuit and more particularly to devices having a power supply circuit that provides more than one power supply voltage.

BACKGROUND OF THE DISCLOSURE

Low power devices, such as PDAs, cell phones, GPS units, and other similar devices, which are often, but not always, handheld electronic devices, often contain a multi-supply power supply circuit. These devices often require circuitry to provide different voltages to different functional blocks within a component, to different components, or to different circuits of the device. Furthermore, the sequence in which different supply voltages are provided to different circuits of the device or to its subcomponents or functional blocks is often critical for the operation of the device. Thus, low power devices must often sequence the voltages for its subcomponents to operate correctly.

One such method of sequencing supply voltages is shown in the device 100 shown in FIG. 1. Device 100 may be any device that requires at least a first and a second supply voltage to operate. If the device is a handheld cell phone, for example, the device may contain components such as a keyboard 102, a display 104, a memory 106, and an antenna 108. Furthermore, a bus 110 may allow different components of the device to communicate with each other or with a baseband processor 112. It should be understood, however, that the device may not include these components or may include additional components, such as a camera, a communication port, an audio port, or any other suitable component for such a device as known in the art.

The device 100 also contains a limited power source 114 labeled as $V_{BAT}$. This limited power source 114 may be a battery, a charged capacitor, a solar cell, or any other suitable limited power source known to one of ordinary skill in the art. The power source is operably connected to a multi-supply power supply circuit, shown in this embodiment as a power supply chip 116, which could be a monolithic integrated semiconductor chip, that can supply different output voltages. In device 100, power supply chip 116 may supply $V_{out\ baseband\ processor}$ 118 to baseband processor 112. Baseband processor may contain one or more general purpose input/output ports ("GPIOs") such as $GPIO_1$ 120 and $GPIO_2$ 122 and up to $GPIO_n$ 124 and among other things, processes baseband information as known in the art. As one skilled in the art will appreciate, baseband processor 112 may use these GPIOs to communicate with other components. In this particular device 100, for example, $GPIO_1$ may communicate with power supply chip 116.

Power supply chip 116 may supply and sequence several different voltages to different components of device 100, such as circuit 126, which may be processing circuitry. As shown in FIG. 1, for example, power supply chip 116 may supply and sequence supply voltages to a graphics processing unit ("GPU") 126. As known to one of ordinary skill in the art, a GPU 126 may be operably connected to a display 104 and provide the processing capabilities to draw pictures, play movies, or perform other graphic or video functions on a display 104. The power supply chip 116 may supply $V_{out\ 1}$ 128 to $V_{in\ 1}$ 130 on circuit 126. Similarly, power supply chip 116 may supply a second supply voltage $V_{out\ 2}$ 132 to $V_{in\ 2}$ 134 and supply voltage $V_{out\ n}$ 136 to $V_{in\ n}$ 138. It should be understood, however, that the power supply chip 116 could supply one or more power supply voltages to any other circuit or circuits. For example, power supply chip 116 could supply one or more power supply voltages to any suitable circuitry, such as processing circuitry, a central processing unit ("CPU," e.g., CPU core), analog processing circuitry, or any other suitable circuit known in the art.

As one of ordinary skill in the art will recognize and appreciate, a power supply chip 116 in a device 100 may perform the desired functions of, among other things, providing one or more supply voltages to the circuit 126 and sequencing them. Furthermore, however, such power supply chips do not come without disadvantages. Of particular interest, they can take up a lot of space, can be inflexible for different configurations, and can be expensive. One technique used to overcome such disadvantages is to use other power supply regulating circuits, such as low dropout regulators ("LDOs"), as shown in device 200 in FIG. 2.

FIG. 2 shows device 200, similar to device 100 of FIG. 100, which requires multiple power supply voltages. Similar to device 100, device 200 may contain a keyboard 102, a display 104, a memory 106, an antenna 108, a bus 110, a baseband processor 112, a limited power source 114, and a circuit 126, such as a GPU. Instead of containing a power supply chip 116 as the multi-supply power supply circuit, however, device 200 includes multiple power supply regulating circuits 202, 204, and 206 to form a multi-supply power supply circuit. 208. The first power supply regulating circuit 202 supplies $V_{out\ 1}$ 210 to $V_{in\ 1}$ 130; the second power supply regulating circuit 204 supplies $V_{out\ 2}$ 212 to $V_{in\ 2}$ 134; and the nth power supply regulating circuit 206 supplies $V_{out\ n}$ 214 to $V_{in\ n}$ 138. Device 200 may also contain additional power supply regulating circuits to provide additional power supply voltages to other components. One example of this is shown as the baseband processor power supply 216, which provides $V_{in}$ 118 to the baseband processor 112.

As one skilled in the art will appreciate, these multiple power supply regulating circuits could be low dropout regulators ("LDOs"). LDOs are linear voltage regulators that can supply a $V_{out}$ with a very low drop in voltage compared to $V_{in}$. LDOs may be discrete, or they may be implemented on larger integrated circuits. Multiple LDOs may even be in the same die. As shown in FIG. 2, LDOs may contain an unregulated input voltage (shown as "In" in FIG. 2), a regulated output voltage, and an enable input. As one example, an LDO may require an enable input signal of at least 1 volt to enable the LDO and may require the enable input signal to drop below 0.2 volts to disable the LDO.

LDOs in a device similar to device 200 receive their enable input signals via GPIOs from a baseband processor 112. For example, power supply regulating circuit 202 receives an enable input signal from $GPIO_1$ 120; power supply regulating circuit 204 receives an enable input signal from $GPIO_2$ 122; and power supply regulating circuit 206 receives an enable input signal via $GPIO_n$ 124. Thus, the baseband processor 112 has the ability to sequence the times at which each LDO supplies its $V_{out}$ by controlling the time at which it enables each power supply regulating circuit. This is advantageous in devices that require sequencing of supply voltages.

As one skilled in the art will readily recognize, however, the implementation of a multi-supply power supply circuit shown in FIG. 2 does have disadvantages. For example, a different GPIO must enable each power supply regulating circuit, such as an LDO, to provide a required sequencing of the power supply voltages. As additional features are continuously being added to low powered, often handheld, devices, however, the number of GPIO ports can be a limiting factor to the potential expansion of such devices because a baseband processor contains a limited number of GPIOs. It is therefore desirable to efficiently use the limited number of GPIO ports on a baseband processor.

Therefore, a need exists for an improved multi-supply power supply circuit.

BRIEF DESCRIPTION OF THE DRAWINGS

A multi-supply power supply circuit will be more readily understood in view of the following description when accompanied by the figures below and wherein like reference numerals represent like elements.

DETAILED DESCRIPTION OF THE DISCLOSURE

Briefly, a multi-supply power supply circuit has a first power supply regulating circuit operative to produce a first power supply voltage. The multi-supply power supply circuit may also include a second power supply regulating circuit operatively coupled to receive the first power supply voltage from the first power supply regulating circuit as an input signal (e.g., an enable input signal) and operative to produce a second and different power supply voltage. The first and second power supply regulating circuits are configured in a manner so that they are self-sequencing. It is further contemplated that the first power supply regulating circuit is operative to produce the first power supply voltage at a steady state condition prior to the second power supply voltage of the second power supply regulating circuit reaching a steady state condition. As skilled in the art may appreciate, the first and second power supply regulating circuits may each be a low drop out regulating circuit or other suitable voltage regulating circuit.

Alternatively, the second power supply regulating circuit may be responsive to the output signal of the first power supply regulating circuit when the first power supply regulating circuit reaches a threshold voltage. In other words, the output of the first power supply regulating circuit must meet a threshold to enable a second power supply regulating circuit.

It is understood that one could use a multi-supply power supply circuit in an apparatus or a handheld apparatus. In such embodiments, a multi-supply power supply circuit may coexist with a limited power source and another circuit operatively coupled to both the first power supply voltage and to the second and different power supply voltage. This circuit could be, for example, a central processing unit ("CPU"), an image processing circuit, or any other suitable circuit.

Furthermore, a handheld apparatus may contain additional features, such as a display, an antenna, and/or a baseband processor. A baseband processor, for example, may be operatively coupled to an independent power supply circuit to provide power to the baseband processor. Additionally, the baseband processor may be operatively responsive to information received by the antenna.

Figure 1:
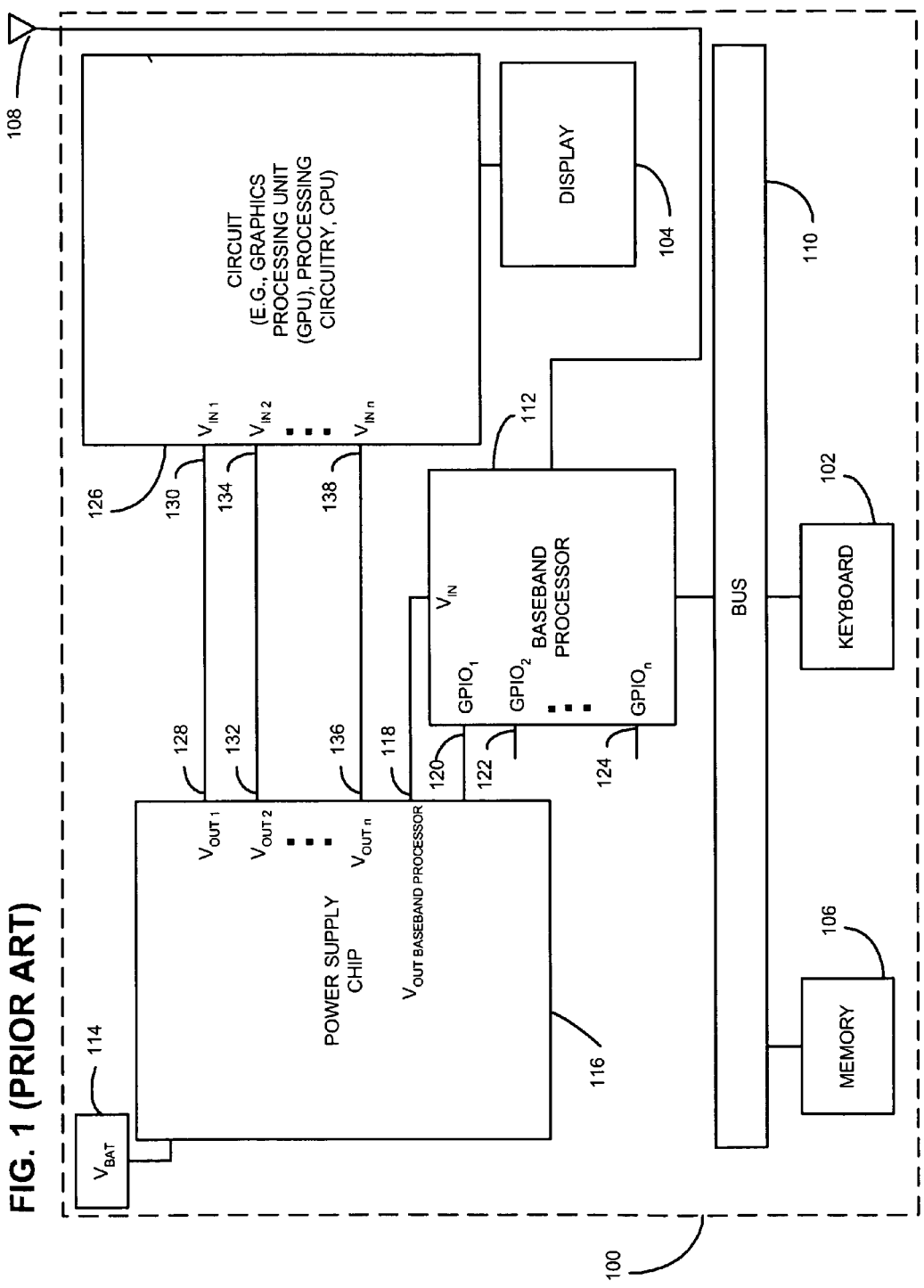
FIG. 1 is a block diagram illustrating a prior art solution for sequencing supply voltages with a power supply chip.
Figure 2:
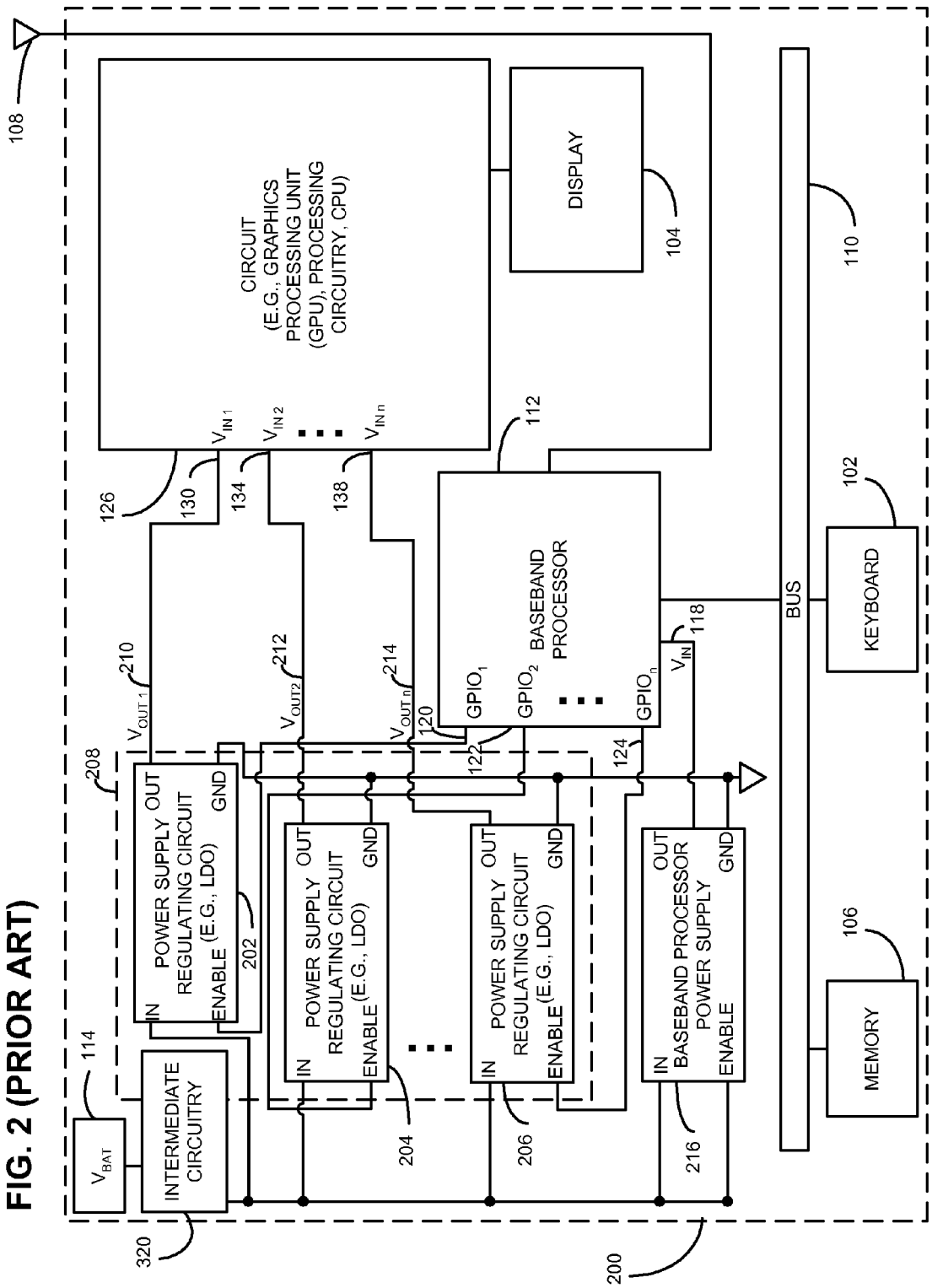
FIG. 2 is a block diagram illustrating a prior art solution for sequencing supply voltages with power supply regulating circuits.
Figure 3:
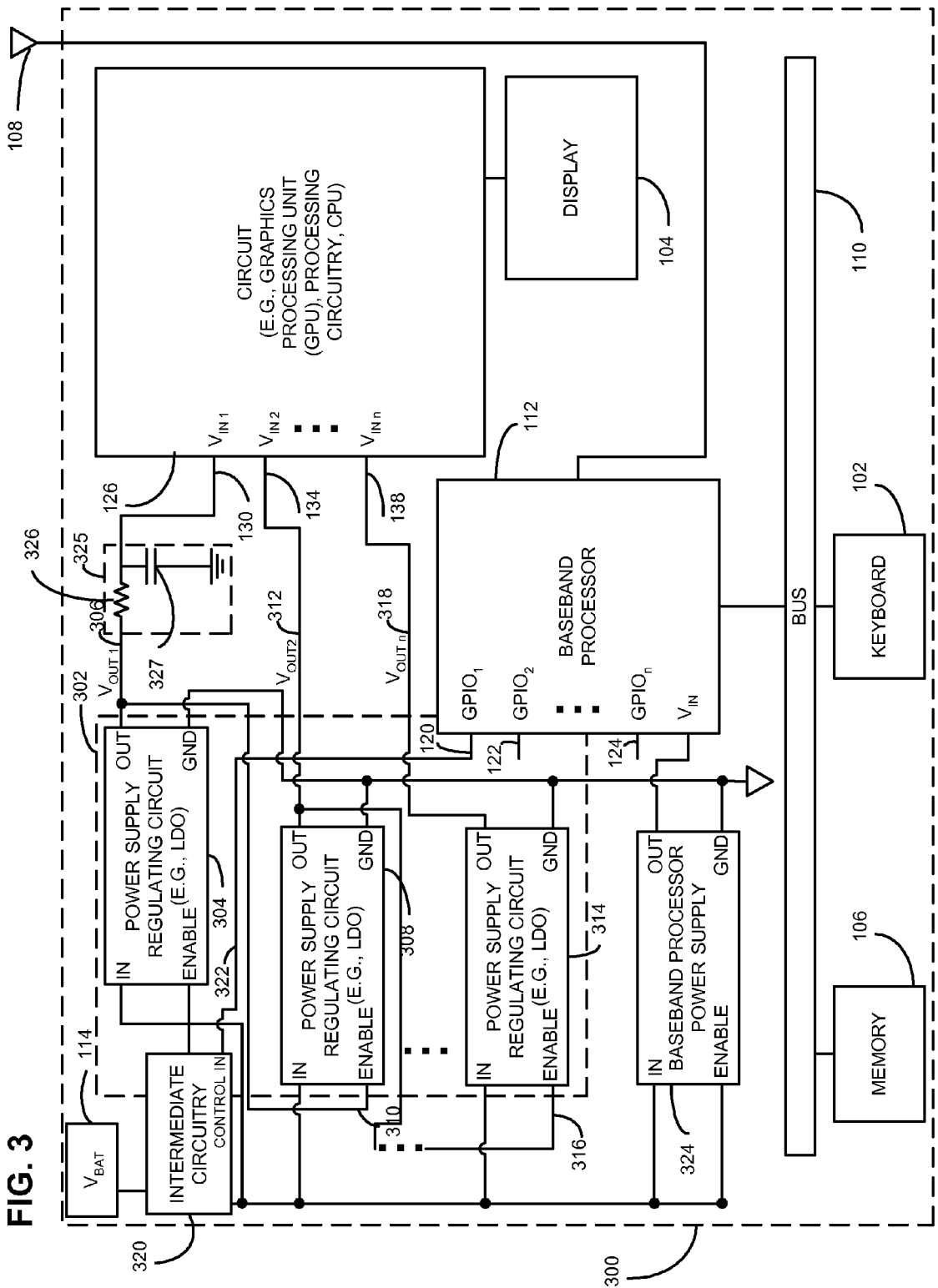
FIG. 3 is a block diagram illustrating one example of an apparatus incorporating a multi-supply power supply circuit in accordance with one embodiment.

FIG. 3 shows one embodiment of a multi-supply power supply circuit 302. As shown in FIG. 3, the multi-supply power supply is in a device 300, which is similar to devices 100 (FIG. 1) and 200 (FIG. 2). For example, it contains memory 106, a keyboard 102, a bus 110, a display 104, and a baseband processor 112. None of these components, however, are required for the teachings disclosed herewith. Instead, these components are illustrated to give one example of the context in which one may use a multi-supply power supply 302.

As shown, a multi-supply power supply circuit 302 may have a first power supply regulating circuit 302 that produces a first power supply voltage $V_{OUT\ 1}$ 306. Multi-supply power supply circuit 302 may also contain a second power supply regulating circuit, such as power supply regulating circuit 308 that receives the first power supply voltage 306 as an enable input signal 310 and produces a second and different power supply voltage $V_{OUT\ 2}$ 312. As one skilled in the art will appreciate, using $V_{OUT\ 1}$ 306 from the first power supply regulating circuit 304 as the enable input signal 310 for a second power supply regulating circuit 308 requires using fewer GPIOs, such as $GPIO_1$ 120, $GPIO_2$ 122, and $GPIO_n$ 124 to control the sequence power up of multiple voltage supplies. Other advantages will be recognized by those of ordinary skill in the art. One may use this cascading technique to continue to enable additional power supply regulating circuits, as required. For example, multi-supply power supply circuit 302 may further contain an nth power supply regulating circuit, such as power supply regulating circuit 314 operatively coupled to receive the second and different power supply voltage 312 as an enable input signal 316 and operative to produce an nth and different power supply voltage $V_{OUT\ n}$ 318. It is also understood that although the embodiment described contains different output voltages, it is possible that the output voltages, such as $V_{OUT\ 1}$ 306, $V_{OUT\ 2}$ 312, and $V_{OUT\ n}$ 318, could be the same voltages.

As one skilled in the art may recognize, multi-supply power supply circuit 208 in FIG. 2 and multi-supply power supply circuit 302 in FIG. 3 have power supply regulating circuits 304, 308, and 314 in FIG. 3 and power supply regulating circuits 202, 204, and 206 shown in FIG. 2, which may be similar circuits—perhaps even off-the-shelf chips of the same model number. One difference, among other things, is that the configuration between the power supply regulating circuits in multi-supply power supply circuit 208 and multi-supply power supply circuit 302 is different. In multi-supply power supply circuit 208, for example, the enable input signal for each power supply regulating circuit 202, 204, and 206 comes from a GPIO on baseband processor 112. For example, $GPIO_1$ 120 sends the enable input signal to power supply regulating circuit 202; $GPIO_2$ 122 sends the enable input signal to power supply regulating circuit 204; and $GPIO_n$ 124 sends the enable input signal to power supply regulating circuit 206. In contrast, however, as previously discussed, the enable input signals, such as enable input signals 310 and 316, in the multi-supply power supply circuit 302 do not come from GPIOs 122 or 124. Instead, the enable input signals 310 and 316 are generated by another power regulating circuit, such as power supply regulating circuits 304 or 308.

As one skilled in the art will readily appreciate, a first power supply regulating circuit 304 in the multi-supply circuit 302 produces the first power supply voltage $V_{OUT\ 1}$ 306 at a steady state condition prior to the second power supply regulating circuit 308 reaching a steady state condition. This effect may occur because of the time it takes for a power regulating circuit, such as power regulating circuit 304 or 308, to ramp up, and it may be better understood by referring to FIG. 4. Additionally, one embodiment of a multi-supply power supply circuit may use low drop out regulating circuits for the power supply regulating circuits 304, 308, 314. The timing of the ramp up can be lengthened by adding an optional R/C circuit 325, containing resistor 326 and capacitor 327, as known in the art, to the output $V_{OUT1}$ 306. This will limit the rise time of the supply (and the enable) to a time constant as set by the relationship of the values of the resistor 326 and the capacitor 327, as known in the art. This R/C circuit 325 could also reduce glitches on the enable signal. As one skilled in the art will appreciate, an R/C circuit similar to R/C circuit 325 could be added to other outputs, such as $V_{OUT2}$ 312 or $V_{OUTn}$ 318 (not shown).

Figure 4:
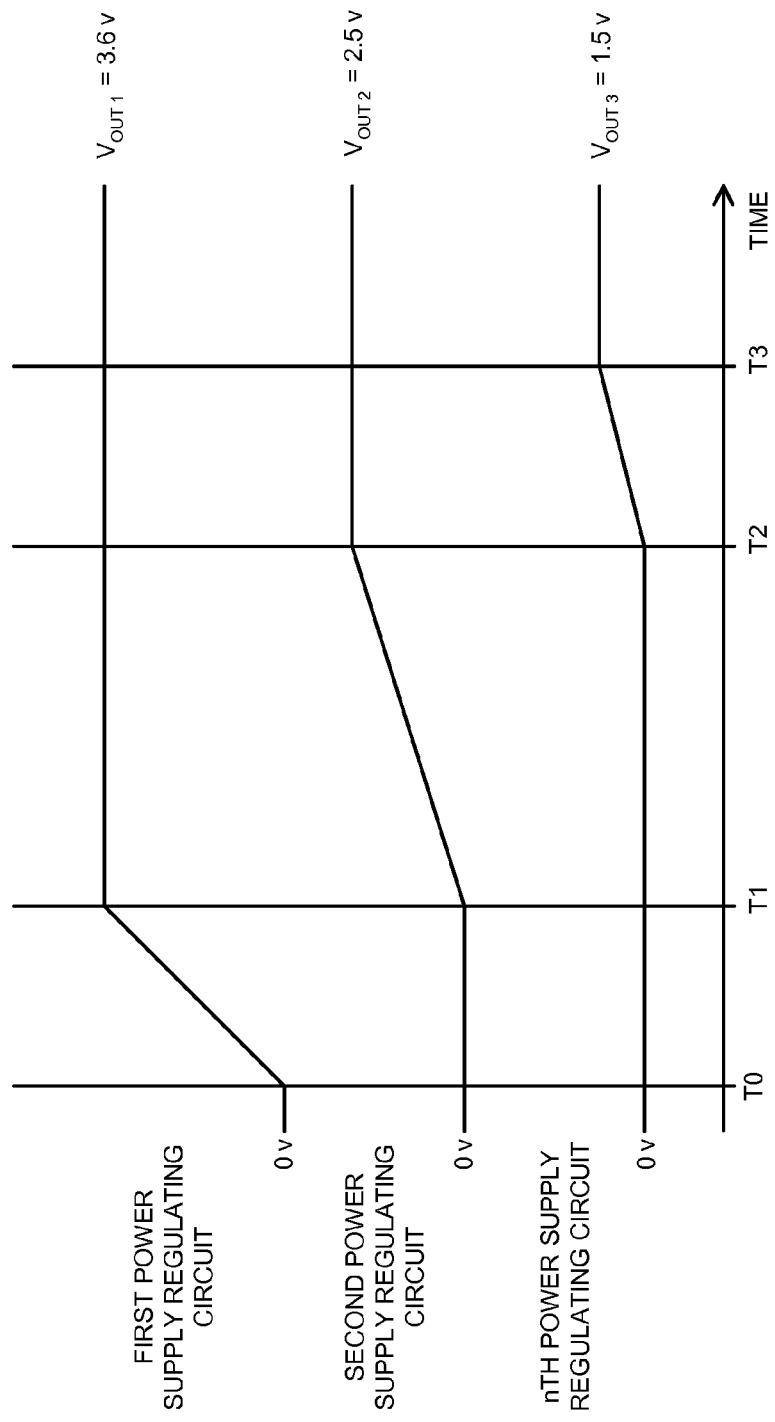
FIG. 4 is a timing diagram illustrating one example of multiple output voltages from a multi-supply power supply circuit.

FIG. 4 shows a timing diagram that helps illustrate the effect caused by configuring multi-supply power supply circuits similar to multi-supply power supply circuit 302 where the power supply regulating circuits, such as 304, 308, and 314, have different ramp up times and where the output voltage from one serves as the enable input signal for another in a cascading configuration. As shown in FIG. 4, all output voltages are equal to 0 volts at a time just before T0. At time T0, $V_{BAT}$ 114 may begin to power up and the power supply regulating circuit 304 receives an enable input signal. As shown in FIG. 3, this enable input signal may be generated by intermediate circuitry 320 or may be just the output voltage from $V_{BAT}$ 114. Alternatively, the enable input signal may be generated by baseband processor 112 and sent via a GPIO. Intermediate circuitry 320 is not required and may be any circuitry, such as a power FET, that is placed between $V_{BAT}$ 114 and the multi-supply power supply circuit 302. It should be noted that the device 200 may also contain similar or even the same intermediate circuitry 320. Intermediate circuitry 320 may, for example, act as a switch, thereby preventing all power supply regulating circuits 304, 308, or 314 from directly receiving an input voltage from $V_{BAT}$ 114. For example and as shown in FIG. 3, intermediate circuitry 320 may receive an intermediate circuitry control signal 322 from $GPIO_1$ 120 via baseband processor 112. As one skilled in the art may appreciate, this intermediate circuitry 320 may prevent a multi-supply power supply circuit 302 from powering up until other circuitry is ready. In this case, for example, baseband processor 112 must first power up and then send intermediate circuitry control signal 322 before intermediate circuitry 320 will allow the power supply regulating circuits 304, 308, or 314 to receive an input voltage and before the first power supply regulating circuit 304 will receive an enable input signal.

Turning back to FIG. 4 at a time T0 when the first power supply regulating circuit 304 receives its enable input signal and/or its input voltage, $V_{OUT1}$ 306 begins to ramp up to its steady state output voltage of 3.6 volts, which it finally reaches at time T1. Since $V_{OUT1}$ 306 serves as the enable input signal 310 for the second power supply regulating circuit 308, second power supply regulating circuit 308 will become enabled at T1 if its enable input must be 3.6 volts. At time a time T2, $V_{OUT2}$ 312 of the second power supply regulating circuit 308 reaches its desired output voltage of 2.5 volts. Since $V_{OUT2}$ 312 serves as enable input signal 316 for the nth power supply regulating circuit 314, power supply regulating circuit 314 will begin to ramp up to its steady state voltage at time T2, and the nth power supply regulating circuit 314 will reach its steady state voltage of 1.5 volts ($V_{OUTn}$ 318) at time T3. Note that the diagram in FIG. 4, however, shows a timing diagram where the output voltage from a first power supply regulating circuit is equal to the required threshold enable voltage for a subsequent power supply regulating circuit. If the enable voltage for a power supply regulating circuit is less than the output voltage of the steady state voltage of the power supply regulating circuit providing the enable input signal, the ramping up of a cascaded power supply regulating circuit could actually begin earlier than depicted in the timing diagram shown in FIG. 4, as understood by one of ordinary skill in the art.

Figure 5:
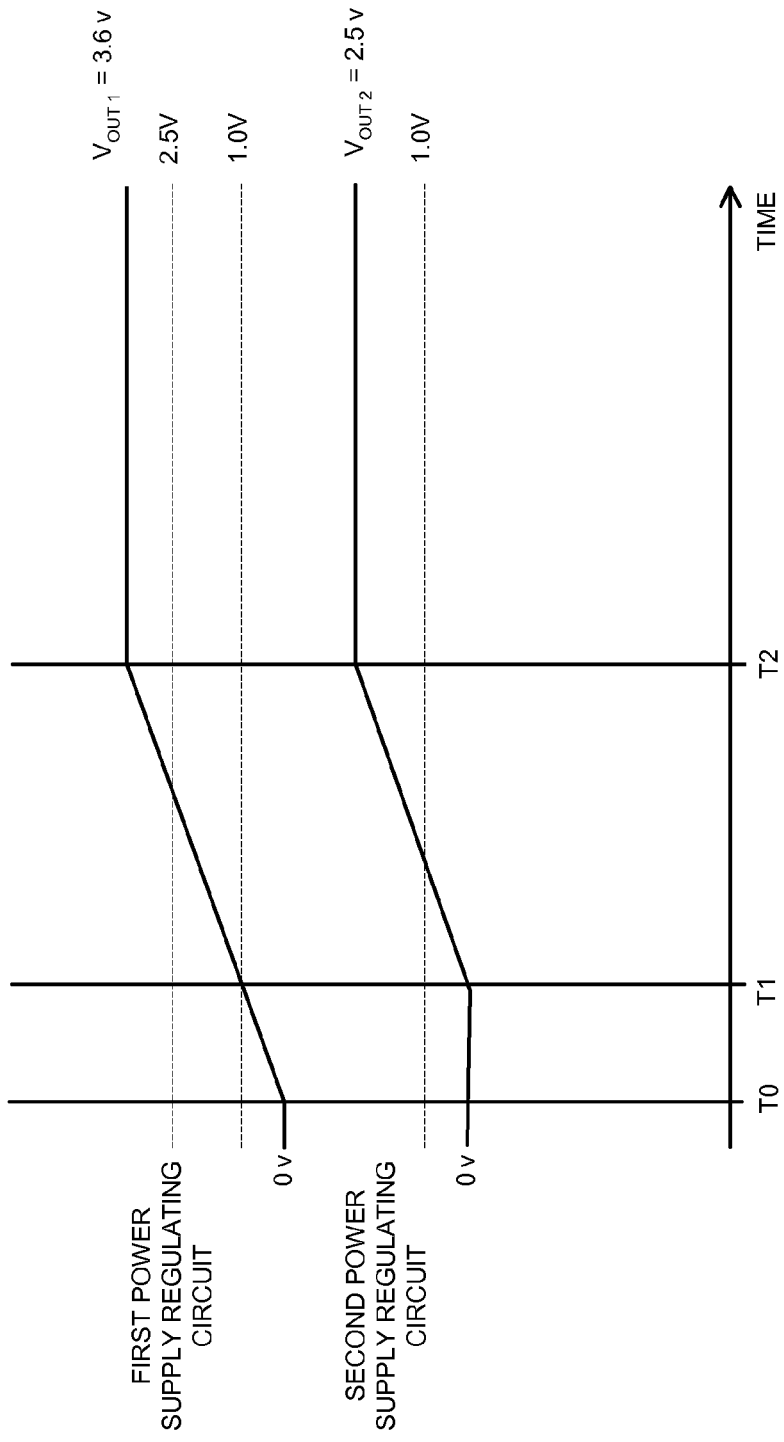
FIG. 5 is a timing diagram illustrating one example of multiple output voltages from a multi-supply power supply circuit.

For example, the timing diagram of another embodiment is shown in FIG. 5. This diagram shows an embodiment wherein the steady state supply voltages of the first and second power supply regulating circuit reach a steady state condition at substantially the same time T2. More specifically, at a time T0 when the first power supply regulating circuit 304 receives its enable input signal and/or its input voltage, $V_{OUT1}$ 306 begins to ramp up to its steady state output voltage of 3.6 volts, which it finally reaches at time T2. Since $V_{OUT1}$ 306 serves as the enable input signal 310 for the second power supply regulating circuit 308, second power supply regulating circuit 308 will become enabled at time T1 if its enable input must be 1.0 volts because this is the time at which $V_{OUT1}$ 306 is 1.0 volts. Note that the second power supply regulating circuit 308 is enabled before first power supply regulating circuit 304 reaches a steady state condition. At a time T2, $V_{OUT2}$ 312 of the second power supply regulating circuit 308 reaches its desired steady state output voltage of 2.5 volts, the same time at which $V_{OUT1}$ 306 reaches its desired steady state condition of 3.6 volts. Other timing variations from a multi-supply power supply circuit will be understood and appreciated by one of ordinary skill in the art.

Another embodiment shown in FIG. 3 is an apparatus, such as apparatus 300, which may include, among other things, a limited power source 114; a multi-supply circuit 302 having a first low drop out power supply regulating circuit 304, operatively coupled to the limited power source 114 and operative to produce a first power supply voltage $V_{OUT1}$ 306; and a second low drop out power supply circuit 308, operatively coupled to the limited power source 114, operatively coupled to receive the first power supply voltage $V_{OUT1}$ 306 from the first power supply regulating circuit 304 as an enable input signal 310 and operative to produce a second and different power supply voltage $V_{OUT2}$ 312. Furthermore, the first power supply regulating circuit 304 may be operative to produce the first power supply voltage $V_{OUT1}$ 306 at a steady state condition prior to the second and different power supply voltage $V_{OUT2}$ 312 of the second power supply regulating circuit 308 reaching a steady state condition and wherein the first power supply voltage $V_{OUT1}$ 306 is higher than the second and different power supply voltage $V_{OUT2}$ 312. It should also be understood that $V_{OUT1}$ 306 could be a lower voltage or same voltage as the second and different power supply voltage $V_{OUT2}$ 312.

It should also be understood, as one of ordinary skill in the art would appreciate, that each of the first and second low drop out power supply regulating circuits 304, 308 (and 314) may be a discrete integrated circuit. For example, each circuit could be in different monolithic dies, the same package, or different packages. It is also possible that all of the low drop out power supply circuits be integrated into the same die or may be in any other suitable form as one of ordinary skill in the art would appreciate.

It is also contemplated, as also shown in FIG. 3, a circuit 126 may be operatively coupled to both the first power supply voltage $V_{OUT1}$ 306 and to the second different power supply voltage $V_{OUT2}$ 312. This circuit 126 may be any suitable processing circuitry, such as but not limited to a central processing unit ("CPU," e.g., one or more cores); analog processing circuitry; an image processing circuit, such as a graphics processing circuit or unit ("GPU") that may include video processing capabilities or a video processing circuit (e.g., a video decoder, encoder); or any other suitable circuit(s) that requires multiple power supply voltages.

In yet another embodiment, apparatus 300 may be a handheld apparatus. In addition to having a multi-supply power supply 302 as described above, a handheld apparatus 300 may further include other features that one skilled in the art would readily appreciate. For example, the limited power source 114 may be removable. As another example, the limited power source may be a voltage source that receives power from a main wall outlet and converts it to a compatible voltage and phase for the device. The handheld apparatus 300 may also include a display 104 and/or an image processing circuit 126 operatively coupled to the display 104 and to both the first power supply voltage $V_{OUT\ 1}$ 306 and to the second and different power supply voltage $V_{OUT\ 2}$ 312. As discussed above, this image processing circuit could be, for example, a graphics processing unit ("GPU") or a video processing circuit.

Yet another feature of a handheld apparatus 300 may be an antenna 108 and a baseband processor 112 operatively responsive to information received by the antenna 108 and operatively coupled to the removable limited power supply source 114. The baseband processor may be coupled to an input voltage from an independent power supply circuit, such as baseband processor power supply 324. The baseband processor power supply could be any suitable power supply circuit, and may be a power supply regulating circuit, such as a low drop out regulating circuit.

As described above, a cascaded multi-supply power supply may, in some embodiments and among other things, provide multiple supply voltages while taking up minimal space. A multi-supply power supply may also reduce the number of required GPIOs on a processor that are sometimes required to control a power up sequence for a circuit, thereby allowing the GPIOs to be used for other purposes. The multi-supply power supply may serve as a self-sequencing circuit structure that can reduce the number of GPIOs for control. Furthermore, some embodiments of a multi-supply power supply circuit as described may prove more cost effective than other multi-supply power supply implementations known in the art.

The above detailed description of the invention and the examples described therein have been presented for the purposes of illustration and description only and not by limitation. It is further contemplated that the present invention cover any and all modifications, variations, or equivalents that fall within the spirit and scope of the basic underlying principles disclosed above and claimed herein.

What is claimed is:

1. A multi-supply power supply circuit comprising:
   a first power supply regulating circuit operative to produce a first power supply voltage; and
   a second power supply regulating circuit having a first input operatively responsive to an input voltage and having a second input operatively coupled to receive the first power supply voltage from the first power supply regulating circuit as an enable input signal and operative to produce a second and lower power supply voltage in response to the enable input signal from the first power supply regulating circuit.

2. The multi-supply power supply circuit of claim 1 wherein the first power supply regulating circuit is operative to produce the first power supply voltage at a steady state condition prior to the second and different power supply voltage of the second power supply regulating circuit reaching a steady state condition.

3. The multi-supply power supply circuit of claim 2 wherein the first power supply regulating circuit and the second power supply regulating circuit are each low drop out regulating circuits.

4. The multi-supply power supply circuit of claim 1 wherein the supply voltages of the first and second power supply regulating circuits reach a steady state condition at substantially the same time.

5. An apparatus comprising:
   a limited power source;
   multi-supply power supply circuit comprising:
   a first power supply regulating circuit, operatively coupled to the limited power source, operative to produce a first power supply voltage;
   a second power supply regulating circuit, operatively coupled to the limited power source, operatively coupled to receive the first power supply voltage from the first power supply regulating circuit as an enable input signal and operative to produce a second and different power supply voltage;
   wherein the first power supply regulating circuit is operative to produce the first power supply voltage at a steady state condition prior to the second and different power supply voltage of the second power supply regulating circuit reaching a steady state condition and wherein the first power supply voltage is higher than the second and different power supply voltage; and
   a circuit operatively coupled to both the first power supply voltage and to the second and different power supply voltage.

6. The apparatus of claim 5 wherein the circuit comprises at least one of: a CPU and an image processing circuit.

7. The apparatus of claim 5 wherein each of the first and second power supply regulating circuits is comprised of a low drop out power supply regulating circuit that is a discrete integrated circuit.

8. An apparatus comprising:
   a first power supply regulating circuit operative to produce a first power supply voltage; and
   a second power supply regulating circuit having a first input operatively responsive to an input voltage and having a second input operative to receive the first power supply voltage from the first power supply regulating circuit as an input signal to the second power supply regulating circuit, and operative to produce a second and lower power supply voltage in response to the input signal, wherein the first and second power supply regulating circuits are configured in a manner so that they are self-sequencing.

9. The apparatus of claim 8 wherein the second power supply regulating circuit is responsive to an output signal of the first power supply regulating circuit when the output signal of the first power supply regulating circuit reaches a threshold voltage.

* * * * *